ns patent 
United States Patent [19]

Schievelbein et al.

[11] 4,160,480
[45] Jul. 10, 1979

[54] HIGH CONFORMANCE OIL RECOVERY PROCESS

[75] Inventors: Vernon H. Schievelbein; Jack H. Park, both of Houston, Tex.

[73] Assignee: Texaco Inc., White Plains, N.Y.

[21] Appl. No.: 863,505

[22] Filed: Dec. 22, 1977

[51] Int. Cl.$^2$ .............................................. E21B 43/22
[52] U.S. Cl. .................................... 166/269; 166/273
[58] Field of Search ................. 252/8.55 R, 8.55 D; 166/273, 274, 269

[56] References Cited

U.S. PATENT DOCUMENTS

| | | | |
|---|---|---|---|
| 3,294,164 | 12/1966 | Hardy et al. | 166/274 |
| 3,358,758 | 12/1967 | Hardy et al. | 166/274 |
| 3,811,504 | 5/1974 | Flournoy et al. | 166/273 |
| 3,866,680 | 2/1975 | Dauben | 166/274 |

*Primary Examiner*—Herbert B. Guynn
*Attorney, Agent, or Firm*—Carl G. Ries; Thomas H. Whaley; Jack H. Park

[57] ABSTRACT

The conformance of an enhanced oil recovery process, including waterflood, surfactant or other chemicalized water flood process, in a formation containing at least two strata or zones of varying permeability, the permeability of one zone being at least 50 percent greater than the permeability of the other zone, is improved by flooding until the higher permeability zone has been depleted, after which an aqueous fluid is injected into the high permeability zone, said fluid having relatively low viscosity at the time of injection and containing a particular surface active agent which promotes the formation of a coarse emulsion in the flow channels of the formation which reduces the permeability of the high permeability zone. After the permeability of the first zone has been reduced substantially, flooding may then be accomplished in the second zone which was originally not invaded by the injected oil recovery fluid since its permeability was substantially less than the permeability of the first zone. The surface active agents are individually tailored and the ratio of dissimilar surfactants balanced to exhibit optimum emulsion formation properties with the particular aqueous fluid present in the flow channels of the formation to be treated.

16 Claims, 2 Drawing Figures

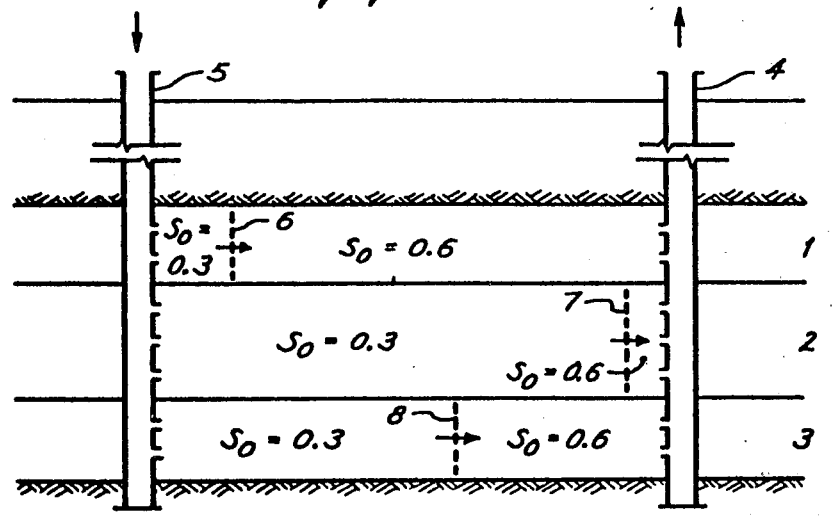
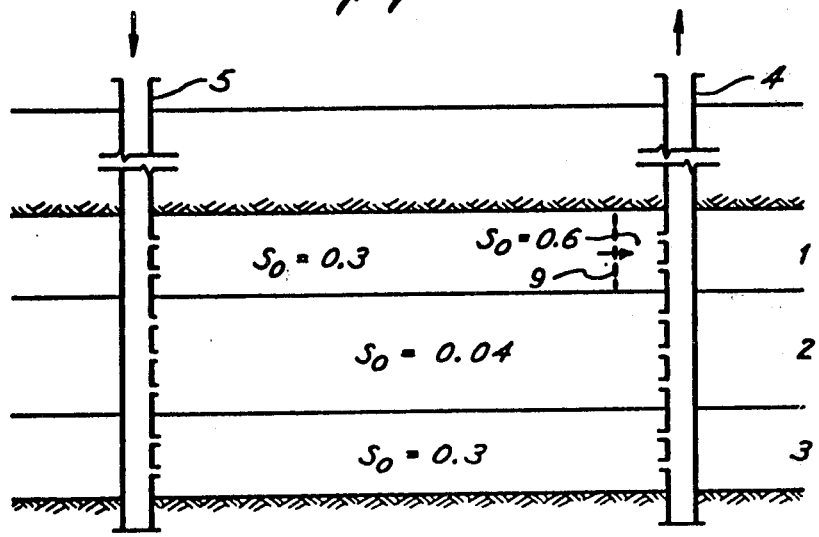

HIGH CONFORMANCE OIL RECOVERY PROCESS

FIELD OF THE INVENTION

This invention concerns a process for use in subterranean formations containing two or more zones which differ from one another in permeability such that water flooding or other enhanced oil recovery processes cannot effectively deplete both zones, resulting in poor vertical conformance. More specifically, the process involves injecting a fluid into the more permeable zone, after it has been depleted by water flooding or other supplemental oil recovery process, which fluid has relatively low viscosity at the time of injection but forms a high viscosity, coarse emulsion with the residual hydrocarbon in the depleted zone to reduce the permeability of that zone to subsequently injected fluids.

BACKGROUND OF THE INVENTION

It is well recognized by persons skilled in the art of petroleum recovery that only a small fraction of the petroleum originally present in a formation can be recovered by primary production, e.g., by allowing the oil to flow to the surface of the earth as a consequence of naturally occuring energy forces, or by so called secondary recovery processes which comprise injecting water into the formation by one or more wells to displace petroleum laterally through the formation toward one or more spaced apart production wells and then to the surface of the earth. Although water flooding is an inexpensive supplemental oil recovery process, water does not displace oil effectively even in those portions of the formation through which it passes, because water and oil are immiscible and the interfacial tension between water and oil is quite high. This too has been recognized by persons skilled in the art of oil recovery, and many surface active agents or surfactants have been proposed for addition to the flood water, which materials reduce the interfacial tension between the injected aqueous fluid and the formation petroleum thereby increasing the microscopic displacement efficiency of the injected aqueous fluid. Surfactants which have been disclosed in the prior art for such purposes include alkyl sulfonates, alkylaryl sulfonates, petroleum sulfonates, alkyl or alkylarylpolyalkoxy sulfates, alkyl- or alkylarylpolyalkoxyalkyl sulfonates, nonionic surfactants such as polyethoxylated aliphatic alcohols or alkanols, and polyethoxylated alkylphenols, and various mixtures thereof.

Even if the surface tension between the injected aqueous fluid and the petroleum present in the subterranean reservoir can be reduced by incorporating surface active agents into the injected fluid, the total oil recovery efficiency of the process is frequently poor because many subterranean petroleum-containing reservoirs are comprised of a plurality of layers of widely differing permeabilities. When any fluid is injected into such a heterogeneous reservoir, the fluid passes primarily through the most permeable zones and little or none of the fluid passes through the lower permeability zones. If the ratio of permeabilities of the zones is as high as 2:1, essentially all of the injected fluid passes through the more permeable zone to the total exclusion of the less permeable zone. Furthermore, the situation described immediately above causing poor vertical conformance of the injected fluid in a heterogeneous reservoir is aggravated by application of the supplemental oil recovery process itself. If water or any other oil displacing fluid is injected into a heterogeneous multi-layered petroleum reservoir, water passes principally through the most permeable zone and displaces petroleum therefrom, and as a consequence further increases the permeability of that zone. Accordingly, the difference between the permeability of the most permeable zone and the lesser permeable zone or zones is increased as a consequence of applying a fluid displacement oil recovery process thereto, including water flooding, surfactant flooding, etc.

The above described problem of poor vertical conformance in water flooding operations has also been recognized by persons skilled in the art, and numerous processes have been described in the prior art for treating the formation to correct the problems encountered when injecting an oil-displacing fluid into a formation having two or more zones of significantly different permeabilities. Many of the these processes involve the use of hydrophilic polymers including partially hydrolyzed polyacrylamide, copolymers of acrylamide and acrylic acid or water soluble acrylates, polysaccharides, etc. Unfortunately, the fluids employing these hydrophilic polymers are substantially more viscous than water at the time of injection, and so injection into the zones is difficult and there is little assurance that they will invade the same zones as would water or another aqueous fluid having about the same viscosity as water. Accordingly, the effectiveness of these prior art processes has been restricted to reducing the permeability of only the most permeable flow channels in a zone, and is furthermore usually restricted only to the near wellbore zone of the formation, e.g. that portion of the most permeable zone in a formation immediately adjacent to the injection well, because of the difficulty of injecting viscous fluids through large portions of the formation.

In view of the foregoing discussion of the problems associated with poor vertical conformance in heterogeneous formations, it can be appreciated that there is a substantial need for a method of treating such formations to reduce the permeability of the very high permeability zones to force subsequently injected oil displacing fluids to pass into those zones which were originally of lower permeability, and so were not invaded by the first injected fluids.

DESCRIPTION OF THE PRIOR ART

Numerous references suggest formulating viscous emulsions on the surface, and injecting the emulsion into a subterranean formation for the purpose of decreasing the permeability of a zone which was originally more permeable than other zones. These include U.S. Pat. Nos. 3,149,669; Reissue 27,198 (original patent U.S. 3,443,636); 3,502,146 (1970); and 3,866,680 (1975). 3,946,812; 3,888,308; 3,508,612; 3,500,923; 3,827,497; 3,811,504 and 3,890,239 relate to the use of sulfated and ethoxylated surfactants in an oil displacing fluid. U.S. Pat. Nos. 3,792,731; 3,799,264; 3,811,504 and 3,811,505 describe oil recovery processes and fluids employing nonionic surfactants.

SUMMARY OF THE INVENTION

We have discovered a process applicable to subterranean, petroleum-containing formations containing two or more zones, at least one of which has a permeability at least 50 percent greater than the other zone, which will permit application of more effective enhanced oil recovery processes such as water flooding or surfactant flooding in both zones. The process involves first injecting water or other aqueous displacing fluid into the formation to pass through the more permeable zone, displacing petroleum therefrom, until the ratio of injected fluid to formation petroleum of fluids being recovered from the formation reaches a predetermined or economically unsuitable level. This further increases the ratio of the permeability of the most permeable zone to the permeability of the lesser permeable zone or zones. Thereafter an aqueous emulsifying fluid fluid is injected into the formation, which fluid flows substantially exclusively into and through the most permeable, previously water flooded zone. The fluid has a viscosity not substantially greater than the viscosity of water, and contains a surfactant combination which readily emulsifies the residual oil present in the previously water flooded zone. The surfactant mixture present in the injected treating fluid must be one which forms an emulsion with the formation petroleum at a salinity about equal to the salinity of the aqueous fluid present in the previously flooded, high permeability zone, and should also be relatively stable with changes in salinity since there are normally variations in water salinity from one point in a subterranean formation to another. The emulsion formed should also be stable with time and changes in salinity at the temperature of the formation, in order to maintain the desired reduction of permeability within the treated zone. The surfactant employed in the process of our invention comprises at least two components: (1) an alkylpolyalkoxy sulfate such as an alkylpolyethoxy sulfate, or an alkylarylpolyalkoxy sulfate, such as an alkylbenzene, (or alkyl substituted toluene or xylene) polyethoxy sulfate. (2) The surfactant mixture will also comprise a relatively low HLB, water insoluble nonionic surfactant, specifically an ethoxylated aliphatic such as an ethoxylated aliphatic alcohol or an ethoxylated alkanol, or an ethoxylated alkylaryl such as an alkylphenol. The specific molecular properties of the nonionic surfactant and the alkyl or alkylarylpolyalkoxy sulfate, as well as the ratio of nonionic to alkoxy sulfate, is chosen so as to optimize the emulsion formation tendency of the surfactant combination with the petroleum and brine present in the portion of the formation to be treated. The optimum surfactants for our process is not an effective surfactant combination for use in a low surface tension oil displacement surfactant water flooding process.

BRIEF DESCRIPTION OF THE DRAWINGS

FIG. 1a illustrates a subterranean oil formation containing three strata or zones of different permeabilities, illustrating the interface between an injected fluid and the petroleum in each zone at a time near the economic end of a water flood process.

FIG. 1b illustrates the same subterranean formation, after it has been subject to the treatment of the process of this invention, and then subjected to additional water flood.

DESCRIPTION OF THE PREFERRED EMBODIMENTS

Briefly, the process of our invention comprises a method of treating a subterranean petroleum-containing formation containing at least two zones or strata whose permeabilities are sufficiently different that a fluid injected into a well in communication with both zones will pass primarily through the more permeable zone. Ordinarily, for example, if the permeability to the flow of the injected fluid in one stratum is at least 50 percent greater than and usually 100 percent greater than the other stratum, fluid injected into wells in fluid communication with both strata will pass almost exclusively into the more permeable stratum. For example, in a water flood applied to such a formation, water will pass into the more permeable stratum exclusively and will displace petroleum toward the production well, with substantially no oil displacement occuring in the less permeable stratum. After oil has been displaced through the more permeable stratum and oil recovery has proceeded to the point at which water breakthrough has occurred at the production well, continued injection of water into the well in communication with both strata will accomplish substantially no additional oil recovery since all of the water injected into the formation passes through the high permeability stratum, even though the oil saturation in the lesser permeable stratum may be substantially the same as it was before commencing water flood or other supplemental oil recovery operations.

Attempts to treat a situation such as that described above by techniques taught in the prior art have been only partially successful for a variety of reasons. Injecting a viscous fluid, which may be either an emulsion formed on the surface for the purpose of plugging the more permeable zone or an aqueous solution of a hydrophilic polymer such as polyacrylamide, partially hydrolyzed polyacrylamide, copolymers of acrylamide and acrylates, polysaccharides, etc., are generally not entirely satisfactory because the more viscous fluid only invades the largest flow channels of the formation, and so does not invade all of the flow channels which would be invaded by a fluid whose viscosity was more nearly equal to the viscosity of water. Furthermore, emulsions formed according to prior art teachings by, for example, adding caustic and water to crude oil are not particularly stable with respect of time and are also not stable with respect to changes in the salinity of fluid with which they may be brought into contact. Thus an emulsion which effectively plugs the larger flow channels of a high permeability zone, including one which has previously been water flooded, may be broken later either as a consequence of the passage of time, or as the emulsion contacts pockets of water having greater or lesser salinity, which frequently are found in most subterranean reservoirs. Moreover, there are problems associated with adsorption of hydrophilic polymers, and furthermore many of the hydrophilic polymers are not sufficiently temperature stable to allow them to be used in even moderate temperature formations.

The fluid injected into the formation according to the process of our invention is an aqueous solution which is itself not an emulsion and is usually essentially oil free, containing one or more surfactants, or surface-active agents, which are carefully chosen on the basis of displaying optimum emulsification characteristics. Surfactants which are effective for this purpose, e.g. for forming gross macroemulsions capable of plugging the flow channels of the formation, are not suitable for low surface tension flooding operations, and will not produce optimum oil displacement in a formation if utilized in a surfactant water flooding process. The reason the surfactants suitable for use in the process of this invention are ineffective for water flooding operations is believed to be that when an emulsion is formed, essentially all of the surface active agents which participate in the emulsification reaction, are concentrated at the interface between the discontinuous and continuous emulsion phases, and so little surfactants remain in the aqueous solution, and so cannot reduce the interfacial tension between formation petroleum and the aqueous fluid present in the flow channels as is necessary to achieve efficient low surface tension displacement of petroleum.

It is necessary that the surfactants utilized in the process of this invention be stable and effective for emulsification at the formation temperature in an aqueous fluid having a salinity about equal to the average salinity of the aqueous fluid present in the flow channel of the high permeability zone, e.g. the zone into which the treating fluid is to be injected. Preferably, the surfactants should be identified by tests utilizing actual fluids from the formation, including brine and formation petroleum, since particular characteristics of any of these fluids will affect the efficiency of these surfactants for emulsification of formation petroleum.

The aqueous emulsifying treating fluid injected into the high permeability zone in practicing the process of our invention contains the following surfactants. (1) A sulfated and ethoxylated surfactant having the following formula:

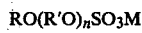

$$RO(R'O)_nSO_3M \qquad (1)$$

wherein R is an aliphatic group, preferably an alkyl, linear or branched, having from 9 to 25 and preferably from 12 to 18 carbon atoms, or an alkylaryl group such as benzene, toluene or xylene having attached thereto at least ne alkyl group, linear or branched, having from 9 to 15 and preferably from 10 to 13 carbon atoms; O is oxygen; R' is ethylene or a mixture of ethylene and higher molecular weight alkylene with relatively more ethylene than higher molecular weight alkylene; n is a number including fractional numbers, from 2 to 10 and preferably from 3 to 7; S is sulfur; and M is a monovalent cation such as sodium, potassium, lithium or ammonium.

(2) A low HLB, essentially water-insoluble nonionic surfactant having the following formula:

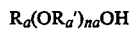

$$R_a(OR_a')_{na}OH$$

wherein $R_a$ is an aliphatic, such as branched or linear alkyl, containing from 9 to 25 carbon atoms and preferably from 12 to 18 carbon atoms, or an alkylaryl group such as benzene, toluene or xylene having attached thereto at least one alkyl group, linear or branched, containing from 9 to 15 and preferably from 10 to 13 carbon atoms in the alkyl chain; $R_a'$ is ethylene or a mixture of ethylene and higher alkylene such as propylene with relatively more ethylene than higher alkylene; and na is a number, either whole or fractional, from 1 to 10 and preferably from 2 to 6.

The balance between the oil soluble and water soluble groups, e.g. the number of carbon atoms in R and $R_a$ and the value of n and na, the number of ethoxy groups, in formulas 1 and 2 above, is slightly different for an optimum emulsifying surfactant for use in our process, compared to an optimum surfactant for flooding processes.

The concentration of the alkyl or alkylarylpolyalkoxy sulfate surfactant will ordinarily be in the range of from about 0.01 to about 10 and preferable from about 0.5 to about 4.0 percent by weight. The concentration of the nonionic surfactant, will ordinarily be from about 0.1 to about 5.0 and preferably from about 0.4 to about 2.0 percent by weight. The ratio of nonionic surfactant to the alkyl or alkylarylpolyalkoxy sulfate will ordinarily be from about 0.1 to about 1.0, depending on the salinity of the fluid in which it is formulated, which in turn is usually about equal to the salinity of the fluid present in the subterranean formation.

The volume of treating fluid to be injected into the formation when applying the process of our invention is ordinarily from about 1.0 to about 100 and preferably from 10 to 50 pore volume percent, based on the pore volume of the high permeability zone or zones to be contacted by the treating fluid. It is important to note that the pore volume on which these numbers are based relate to the pore volume of the high permeability zone to be treated, not the pore volume of the whole formation. A near well bore treatment may be effective in oil reservoirs having impermeable shale layers between oil bearing zones. In such reservoirs, the volume of treating fluid is ordinarily from 50 to 100 pore volume percent within the zone radius to be treated.

This fluid and process is suitable for use in formations which contain water whose salinity is from 10,000 to 200,000 parts per million total dissolved solids, and whose temperature is as high as 150° F. (66° C.).

The procedural steps involved in applying the process of our invention to a subterranean formation are best understood by referring to the attached drawing, to which the following description applies.

A subterranean, petroleum-containing formation is located at depth of about 6200 feet, and it is determined that the total thickness of the formation is 35 feet. The formation is not homogeneous in terms of permeability, however; rather, the formation is made up of three separate strata or layers. The initial oil saturation in all three layers is approximately 30 percent. Oil saturation in the drawing is designed $S_o$. Layer 1, the top layer in the formation, has a permeability of about 6 md and is approximately 10 feet thick. Layer 2, the middle zone of the formation, has a permeability of about 46 md and is about 15 feet thick. Layer 3, which occupies the lower portion of the formation, is approximately 10 feet thick and has an average permeability of about 15 md. The formation temperature is 105° F. (40.6° C.).

Water is injected into injection well 5 which is in fluid communication with the full vertical thickness of the formation, i.e., with all three layers of the formation. Since the permeability of layer 2 is substantially greater than the permeability of either layer 1 or layer 3, water flows much more readily into layer 2, and substantially all of the oil production obtained as a consequence of water injection is in fact derived from layer 2. It should be noted that this is not necessarily apparent to operators on the surface of the earth, however. Water injection continues and an interface is formed in each layer between the injected water flood and an oil bank that is formed as a consequence of the water flood, which are designated as 6 in layer 1, 7 in layer 2 and 8 in layer 3. At a time just before water breakthrough at the production well 4, the position of interfacial zones 6, 7 and 8 is shown in FIG. 1a. It can be seen that water breakthrough is about to occur at production well 4 from layer 2. Once water breakthrough occurs, further injection of water into well 5 will not recover any significant amount of additional oil from any of the three layers. All of the water injected after breakthrough of water at production well 4 will pass into and through layer 2, and essentially no additional water will pass into layers 1 and 3. Thus interfaces 6 and 8 will remain approximately where they are shown in FIG. 1a after breakthrough of water into the production well at layer 2, no matter how much additional water is injected into the injection well and flowed through the reservoir. At this time oil production drops off rapidly and the amount of water being produced increases rapidly until further water injection and oil production are no longer economically feasible, even though large amounts of oil remain in layers 1 and 3.

The water that has been utilized for water flooding is itself from the same formation, and so the salinity of the water being injected into the formation and the salinity of water naturally present in the formation is about the same, and it is determined that in this example the salinity of this water is approximately 110,000 parts per million total dissolved solids including 9800 parts per million divalent ions, principally calcium and magnesium. It is desired to formulate a treating fluid suitable for use in this high salinity environment, and the surfactant is chosen by a series of laboratory experiments employing actual samples of field water and petroleum from the formation into which the treating fluid is to be injected. After a series of laboratory tests, essentially similar to those to be described later hereinafter below, it is determined that a preferred emulsifying fluid for use in reducing the permeability of layer 2 is a sodium dodecylbenzenepolyethoxy sulfate containing an average of 3.5 ethoxy groups per molecule, and a 3.0 mole polyethoxylated dodecylphenol nonionic surfactant. The concentration of the sodium dodecylbenzenepolyethoxy sulfate is approximately 1.3 percent and the concentration of the nonionic surfactant is approximately 0.6 percent by weight. The salinity of the emulsifying fluid is 110,000 ppm total dissolved solids.

Since the wells are 150 feet apart, and the formation to be treated is principally layer 2, which is 15 feet thick, and since it is determined that the swept area in a simple two-spot pattern such as this is 11,200 square feet, the volume of formation (30% porosity) to be treated is (11,200)(15)(0.30) = 50,400 cu. ft.

A 20 percent pore volume slug is chosen for use in treating the above identified zone. Accordingly, the volume of the solution necessary to treat layer 2 in this example is approximately 10,080 cubic feet or 2133 cubic meters or 75,398 gallons.

The above described emulsifying fluid is injected into injection well 5. Because the permeability of layer 2 is substantially greater than the permeability of layers 1 and 3 at that time, the difference being substantially greater than it was existed at the time water flooding was initiated, it is not necessary to isolate layer 2 from the other layers for the purpose of selectively injecting the fluid into layer 2. Substantially all of the fluid injected into well 5, which is in fluid communication with all of the formation, will pass into layer 2. Injection of the treating fluid into layer 2, which causes an emulsion to form in layer 2, reducing the permeability of the layer and additionally recovering some additional oil therefrom, reduces the oil saturation in layer 2 to only 4 percent. Water injection is then again resumed into the formation. Since the permeability of layer 2 has been increased substantially, water injected into well 5 will now flow principally into layers 1 and 3, and so will continue pushing the interface between the injected water and the formation petroleum toward the production well. If water from layer 3 breaks through at producing well 4 before it does in layer 1, it may be necessary to treat layer 3 in about the same fashion as was used to treat layer 2 in the procedural steps described above. After this has been accomplished, water injection may again be resumed, with essentially all of the water passing into layer 1. Water injection is then continued until water again breaks through at well 4, signifying that substantially all of the formation has been swept by water flooding.

After completion of the above described multi-step water flood with intermittent treatment to alleviate the adverse permeability distribution problem, the formation may thereafter be subjected to additional supplemental oil recovery processes such as, for example, surfactant flooding, since the permeability of the formation has now been made more homogeneous and there still remains a substantial amount of petroleum in layers 1 and 3 sufficient to justify the injection of an efficient, low surface tension oil displacing fluid into layers 1 and 3.

For the purpose of illustrating the types of fluids suitable for use in the process of our invention, and illustrating the results obtainable from application thereof, a series of laboratory experiments were performed.

A series of emulsification tests were conducted to illustrate how slight changes in surfactant molecular characteristics affect emulsification effectiveness of the surfactant. These tests comprised mixing together 5 cc's of oil and 30 cc's of the one percent surfactant solution in an 85 kilogram/meter$^3$ (85,000 ppm) brine. The solutions were heated to a temperature of 109° F. (42.8° C.) and shaken periodically over an eight hour period. The solutions were then allowed to equilibrate for several days, and the volume of emulsion and total volume of fluid including the emulsion, the oil and the aqueous phase, were observed. The figures reported in Table I below under volume ratio represents the volume of emulsion divided by the total volume of fluid, including emulsion and separate phases of the field brine and any unemulsified oil that may have been present. It can be seen that a change in the number of ethoxy groups of only ±0.2 causes a very significant change in the emulsification effectiveness of the surfactant.

TABLE I

| Run | Average number of moles of ethylene oxide per mole of surfactant(1) | Emulsification ratio (volume of emulsion ÷ total fluid volume) |
| --- | --- | --- |
| 1 | 2.6 | 0.02 |
| 2 | 2.8 | 0.39 |
| 3 | 3.0 | 0.02 |
| 4 | 3.2 | 0.00 |
| 5 | 3.4 | 0.00 |

(1)One percent of dodecylbenzenepolyethoxyhydroxypropylene sulfonate.

Laboratory equipment was especially constructed for core flood tests, and comprised essentially two separate formation earth core samples of significantly different permeabilities encased in holders and arranged for flooding, with the two cores being placed in parallel to simulate the situation similar to that described above, in which an injection well contacts two earth strata of substantially different permeabilities. Fluids injected into the apparatus will pass predominantly through the highest permeability core to the exclusion of the other core. In all of the experiments described below, the cores were separately water flooded to an irreducable oil saturation prior to being connected in parallel for the purpose of studying the effect of the adverse permeability distribution-correcting treatment of our invention.

In the first experiment of this series, run 7, core A was a fresh Berea limestone core having a permeability of 704 millidarcy. The core was 5.08 cm in diameter and 15.8 cm in length and had a total pore volume of 73 cubic centimeters. The porosity was 23 percent. The residual oil saturation after water flooding was 25 percent. Core B utilized in Run 7 was a similar size core having pore volume of 65 cubic centimeters and a porosity of 20 percent, but a much lower permeability, only 139 millidarcy. The residual oil saturation of Core B after water flooding was 35 percent. After the cores were flooded to irreducable water saturation and mounted in parallel, water injection into the cores at a flow rate of 0.9 cc per minute resulted in a receptivity ratio (the ratio of the volume of fluid injected into core A divided by the volume of fluid injected into core B during the same period, when the cores are connected in parallel) of approximately 5.8. During the treatment procedure the receptivity ratio declined to 4.7 and levelled off at 4.0 during the subsequently applied water flood operation. A quantity of petroleum sulfonate solution was then injected, and during the surfactant flood portion of the test, the receptivity declined still further to 2.4. A polymer mobility control buffer was then injected into the system, and the receptivity ratio increased to 4.2 after 0.2 pore volumes of the polymer solution had been injected, and then rose to 5.6 after 1 pore volume of polymer had been injected. It is believed that the increase in receptivity ratio resulting from the fact that the polymer was dissolved in fresh water, which broke the emulsion formed in the course of the treatement procedure described above. Nevertheless, Run 7 clearly illustrates how treatment of two cores in a parallel arrangement, which cores have widely different permeabilities, can reduce the permeability deviation between the two cores and improve the receptivity ratio from 5.8 to 2.4, which is substantially less than half of the original receptivity ratio.

Run 8 was performed to verify that in situ emulsification was the mechanism responsible for the improvement in receptivity noted in experiment 7 above. In Run 8, two packs of crushed formation core material were formulated and cleaned. Pack C was saturated with crude oil and pack D was not. Pack C was water flooded to an irreducable oil saturation prior to the treatment. Both packs were treated with 13 pore volume percent of a 30 kilogram/meter$^3$ solution of dinonylphenolpolyethoxyethyl sulfonate (3.8 ethoxy groups per molecule average) and finally flooded with field brine. In this experiment, the packs were not flooded in parallel as was the case in Run 7 above but rather were independently flooded after treatment with the emulsifying fluid. The pressure differential across the packs was determined during the course of the treatment and subsequent water flood as an indication of increasing resistance to fluid flow through the packs. The pack which was originally saturated with oil, water flooded and then treated, experienced a four-fold increase in the pressure required to flood with water in a constant rate flood whereas the pack which contained essentially no oil prior to the treatment experienced less than a 50 percent increase in differential pressure during the course of approximately 3 pore volumes of water flood. This clearly illustrates that oil must be present in the treated formation for the injectivity-reducing emulsification phenomena to be achieved, which is necessary for the treatment described herein to accomplish the desired objective of reducing the permeability of the high permeability zone.

Experiment 9 was comparable to experiment 7, except the treating solution contained 13.6 kg/m$^3$ dodecylbenzene (3.0) polyethoxyethylene sulfonate with 7.6 kg/m$^3$ 3.0 mole ethylene oxide adduct of dodecylphenol and packs were formulated from crushed formation core material. Pack E had 96 millidarcy permeability and Pack F had 20 millidarcy permeability. After the packs were each flooded to irreducable water saturation and mounted in parallel, water injection into the cores at a flow rate of 1.0 cm$^3$ per minute in a receptivity ratio (Pack E/Pack F) of 4.6. During the treatment procedure, the receptivity ratio decline to 2.8 and levelled off at 1.0 during the subsequently applied water flood operation. A receptivity ratio of 1 was maintained during injection of petroleum sulfonate solution and the ratio fluctuated between 1.6 and 0.6 during a polymer solution injection. Experiment 9 clearly illustrates that the sulfonate-nonionic mixture can be used to reduce the permeability deviation between two packs.

TABLE II

| Run | Core or Pack | Initial Permeability to Water | Volume of Treating Fluid | Material Used | Receptivity Prior To Treatment | Ratios After Treatment | ΔP After Treatment ΔP Before Treatment |
|---|---|---|---|---|---|---|---|
| 7 | A | 704 | .14 | (2) | 5.8 | 4.0$^{(1)}$ | — |
|   | B | 139 | .03 |   |   |   |   |
| 8 | C | 75 | 0.13 | (2) | — | — | 4.0 |
|   | D | 65 | 0.17 |   | — | — | 1.4 |
| 9 | E | 96 |   | (3) | 4.6 | 1.0 | — |
|   | F | 20 |   |   |   |   |   |

$^{(1)}$Reduced to 2.4 on injecting petroleum sulfonate oil displaced fluid
$^{(2)}$Dinonylphenol (3.8) polyethoxyethyl sulfonate
$^{(3)}$Dodecylphenol (3.0) polyethoxyethyl sulfonate + dodecylphenol (3.0) polyethoxylate While the above discloses mixing the two essential surfactants in a single fluid, two or more fluids each containing only one component can be injected sequentially so as to achieve mixing in the formation. In certain applications, there is an advantage to this embodiment in that emulsification is delayed and greater in depth treatment of the high permeability zone is achieved.

Thus we have disclosed and demonstrated how it is possible to treat a formation containing two or more strata of substantially different permeabilities so as to reduce the permeability of the more permeable strata, by injecting an emulsifying fluid thereinto which forms a gross macroemulsion with residual oil remaining in the flow channels of the flooded portion of a formation after water flooding, thereby reducing the permeability difference between the strata, after which water or other oil displacing fluids may be injected into the formation with substantially improved vertical conformance over that which would be obtained without the permeability adjusting treatment of our invention.

While our invention has been described in terms of a number of illustrative embodiments, it is clearly not so limited since many variations thereof will be apparent to persons skilled in the art of oil recovery without departing from the true spirit and scope of our invention. It is our desire and intention that our invention be limited only by those limitations and restrictions appearing in the claims appended immediately hereinafter below.

We claim:

1. A method of recovering petroleum from a subterranean, petroleum-containing formation, the temperature of said formation being not greater than 150° F., said formation containing water whose salinity is from 10,000 to 200,000 parts per million total dissolved solids, said formation containing at least two distinct petroleum-containing strata or layers, the permeability of at least one of said strata being at least 50 percent greater than the permeability of the other stratum, said formation being penetrated by at least one injection well and by at least one production well, both wells being in fluid communication with at least two of said formation strata, comprising
   (a) injecting a first aqueous oil-displacing fluid into the formation via the injection well, said fluid passing through at least one of the more permeable strata of said formation and displacing oil therein toward the production well, from which it is recovered to the surface of the earth;
   (b) after said first aqueous oil displacing fluid has passed substantially through at least one of said more permeable strata to the production well, discontinuing injecting said fluid and injecting into said stratum an aqueous emulsifying fluid containing an emulsifying surfactant combination comprising (1) from 0.01 to 10.0 percent by weight of an alkylpolyalkoxy sulfate or alkylarylpolyalkoxy sulfate having the following formula:

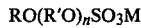

$RO(R'O)_nSO_3M$ wherein R is an alkyl group, linear or branched, having from 9 to 25 carbon atoms, or an alkylaryl group selected from the group consisting of benzene, toluene and xylene having attached thereto at least one alkyl group, linear or branched, having from 9 to 15 carbon atoms; R' is ethylene or a mixture of ethylene and higher molecular weight alkylene with relatively more ethylene than higher alkylene; n is a number including fractional numbers, from 2 to 10; and M is a monovalent cation selected from the group consisting of sodium, potassium, lithium and ammonium, and (2) from about 0.1 to about 5.0 percent by weight of a low HLB, water insoluble nonionic surfactant having the following formula:

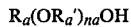

$R_a(OR_a')_{na}OH$ wherein $R_a$ is a branched or linear alkyl group, containing from 9 to 25 carbon atoms, or an alkylaryl group selected from the group consisting of benzene, toluene or xylene having attached thereto at least one alkyl group, linear or branched, containing from 9 to 15 carbon atoms, $R_a'$ is ethylene or a mixture of ethylene and propylene with relatively more ethylene than propylene; and na is a number either whole or fractional, from 1 to 10, said emulsifying surfactants forming a macroemulsion in the more permeable strata of the formation, thereby reducing the permeability of the strata invaded by the emulsifying fluid; and (c) thereafter injecting a second aqueous oil displacing fluid into the formation; said fluid invading at least one stratum not invaded by the first oil displacing fluid of step (a) and displacing oil therein toward the production well where it is recovered to the surface of the earth.

2. A method as recited in claim 1 wherein the first oil displacing fluid is water.

3. A method as recited in claim 1 wherein the second oil displacng fluid is water.

4. A method as recited in claim 1 wherein R is an alkyl group containing from 12 to 18 carbon atoms.

5. A method as recited in claim 1 wherein R is an alkylaryl group and the number of carbon atoms in the alkyl group is from 10 to 13.

6. A method as recited in claim 5 wherein R is an alkylbenzene group.

7. A method as recited in claim 1 wherein R' is ethylene.

8. A method as recited in claim 1 wherein the value of n is from 2 to 7.

9. A method as recited in claim 1 wherein the ratio of the nonionic surfactant to the alkylpolyalkoxy sulfate or alkylarylpolyalkoxy sulfate is from about 0.1 to about 1.0.

10. A method as recited in claim 1 wherein the concentration of alkyl or alkyl aryl polyalkoxysulfate surfactant is from about 0.5 to about 4.0.

11. A method as recited in claim 1 wherein the concentration of nonionic surfactant is from about 0.05 to about 2.0 percent by weight.

12. A method as recited in claim 1 wherein the volume of emulsifying surfactant-containing fluid is from about 1.0 to about 100 pore volume percent based on the pore volume of the strata to be treated thereby.

13. A method as recited in claim 12 wherein the volume of fluid is from about 10 to about 50 pore volume percent.

14. A method as recited in claim 1 wherein said formation contains at least three strata, each differing in permeability from one another, and the steps of injecting said emulsifying surfactant-containing fluid and then injecting said second aqueous oil-displacing fluid are applied to the formation at least twice.

15. A method as recited in claim 14 wherein the steps of injecting said emulsifying surfactant-containing fluid and said aqueous oil-displacing fluid are repeated until oil-displacing fluid has swept substantially all of the petroleum-containing strata of said formation.

16. A method of recovering petroleum from a subterranean, petroleum-containing formation, the temperature of said formation being not greater than 150° F., said formation containing water whose salinity is from 10,000 to 200,000 parts per million total dissolved solids, said formation containing at least two distinct petroleum-containing strata or layers, the permeability of at least one of said strata being at least 50 percent greater than the permeability of the other stratum, said formation being penetrated by at least one injection well and by at least one production well, both wells being in fluid communication with at least two of said formation strata, comprising
   (a) injecting a first fluid comprising an aqueous oil-displacing fluid into the formation via the injection well, said fluid passing through at least one of the more permeable strata of said formation and displacing oil therein toward the production well, from which it is recovered to the surface of the earth;

(b) after said first aqueous oil displacing fluid has passed substantially through at least one of said more permeable strata to the production well, discontinuing injecting said first fluid and injecting into said stratum a second aqueous fluid containing from 0.01 to 10.0 percent by weight of an alkylpolyalkoxy sulfate or alkylarylpolyalkoxy sulfate having the following formula:

$$RO(R'O)_n SO_3 M$$

wherein R is an alkyl group, linear or branched, having from 9 to 25 carbon atoms, or an alkylaryl group selected from the group consisting of benzene, toluene and xylene having attached thereto at least one alkyl group, linear or branched, having from 9 to 15 carbon atoms; R' is ethylene or a mixture of ethylene and higher molecular weight alkylene with relatively more ethylene than higher alkylene; n is a number including fractional numbers, from 2 to 10; and M is a monovalent cation selected from the group consisting of sodium, potassium, lithium and ammonium;

(c) injecting a third fluid containing from 0.1 to 5.0 percent by weight of a low HLB, water insoluble nonionic surfactant having the following formula:

$$R_a(OR_a')_{na}OH$$

wherein $R_a$ is a branched or linear alkyl group, containing from 9 to 25 carbon atoms, or an alkylaryl group selected from the group consisting of benzene, toluene or xylene having attached thereto at least one alkyl group, linear or branched, containing from 9 to 15 carbon atoms, $R_a'$ is ethylene or a mixture of ethylene and propylene with relatively more ethylene than propylene; and na is a number either whole or fractional, from 1 to 10, said second fluid and third fluid mixing in the formation forming a macroemulsion in the more permeable strata of the formation, thereby reducing the permeability of the strata invaded by the emulsifying fluid; and (d) thereafter injecting a fourth fluid comprising an aqueous oil-displacing fluid into the formation; said fluid invading at least one stratum not invaded by the first oil displacing fluid of step (a) and displacing oil therein toward the production well when it is recovered to the surface of the earth.

* * * * *